US012744233B2

(12) United States Patent
Ban

(10) Patent No.: US 12,744,233 B2
(45) Date of Patent: Sep. 22, 2026

(54) METHOD AND DEVICE FOR INSPECTING ELECTRODE ALIGNMENT OF A BATTERY CELL

(71) Applicants: HYUNDAI MOTOR COMPANY, Seoul (KR); KIA CORPORATION, Seoul (KR)

(72) Inventor: Jinho Ban, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 887 days.

(21) Appl. No.: 17/991,888

(22) Filed: Nov. 22, 2022

(65) Prior Publication Data

US 2023/0343986 A1 Oct. 26, 2023

(30) Foreign Application Priority Data

Apr. 21, 2022 (KR) ........................ 10-2022-0049651

(51) Int. Cl.
*H01M 10/04* (2006.01)
*H01M 50/538* (2021.01)

(52) U.S. Cl.
CPC ..... *H01M 10/0409* (2013.01); *H01M 50/538* (2021.01)

(58) Field of Classification Search
CPC .......... H01M 10/0409; H01M 10/4285; G01B 11/00; G01B 11/27; G01B 11/14; G06T 5/50; G06T 7/13; G06T 7/70
See application file for complete search history.

(56) References Cited

U.S. PATENT DOCUMENTS 10,655,952 B2 * 5/2020 Wakita .................. G01N 13/02
12,442,746 B2 * 10/2025 Gordon ............. G01N 15/1459
(Continued)

FOREIGN PATENT DOCUMENTS

CN 115824037 A * 3/2023
CN 116936900 A * 10/2023 ........ H01M 10/0409
(Continued)

OTHER PUBLICATIONS

Translation of CN-115824037-A (Year: 2023).*
(Continued)

*Primary Examiner* — Jeffrey T Carley
(74) *Attorney, Agent, or Firm* — Lempia Summerfield Katz LLC

(57) ABSTRACT

Disclosed is a method for inspecting electrode alignment of a battery cell that inspects an alignment state of a jelly roll including a negative electrode plate, a positive electrode plate, and a separator of the battery cell. The method includes: supplying the separator to fix both portions of the separator to a stack table using a first gripper and a second gripper; rotating the stack table to face one side; stacking the negative electrode plate on the separator; fixing the negative electrode plate on the separator; obtaining a first image by photographing the negative electrode plate and by calculating a position of the negative electrode plate; rotating the stack table to face the other side and supplying the separator on the negative electrode plate after the second gripper is released; stacking the positive electrode plate on the separator; and fixing the positive electrode plate on the separator.

9 Claims, 28 Drawing Sheets

(56) References Cited

U.S. PATENT DOCUMENTS

| | | | | |
|---|---|---|---|---|
| 2019/0341658 | A1 | 11/2019 | Han et al. | |
| 2022/0216501 | A1* | 7/2022 | Oh | H01M 10/0404 |
| 2022/0311102 | A1* | 9/2022 | Cournoyer | B23K 31/125 |
| 2023/0065858 | A1* | 3/2023 | Ueda | G01N 21/894 |
| 2023/0109550 | A1* | 4/2023 | Chen | G03B 17/12 |
| | | | | 348/95 |

FOREIGN PATENT DOCUMENTS

| | | | | | |
|---|---|---|---|---|---|
| JP | 6589663 | B2 | | 9/2019 | |
| KR | 101297395 | B1 | | 8/2013 | |
| KR | 20130124098 | A | | 11/2013 | |
| KR | 101956758 | B1 | * | 3/2019 | B65H 23/26 |
| KR | 20190126524 | A | | 11/2019 | |
| KR | 20200059838 | A | | 5/2020 | |
| KR | 20210031152 | A | * | 3/2021 | H01M 10/0459 |
| KR | 20210045181 | A | | 4/2021 | |
| WO | WO-2019190054 | A1 | * | 10/2019 | H01M 10/0585 |
| WO | WO-2021112481 | A1 | * | 6/2021 | H01M 10/0404 |

OTHER PUBLICATIONS

Translation of CN-116936900-A (Year: 2023).*
Translation of KR-101956758-B1 (Year: 2019).*
Translation of KR-20210031152-A (Year: 2021).*
Translation of WO-2019190054-A1 (Year: 2019).*
Translation of WO-2021112481-A1 (Year: 2021).*

* cited by examiner

METHOD AND DEVICE FOR INSPECTING ELECTRODE ALIGNMENT OF A BATTERY CELL

CROSS-REFERENCE TO RELATED APPLICATION

This application claims priority to and the benefit of Korean Patent Application No. 10-2022-0049651, filed in the Korean Intellectual Property Office on Apr. 21, 2022, the entire contents of which are incorporated herein by reference.

BACKGROUND

(a) Field

The present disclosure relates to a method and an apparatus for inspecting electrode alignment of a battery cell, and more particularly, to a method and a device for inspecting electrode alignment of a battery cell in real time when battery cells are stacked.

(b) Description of the Related Art

Generally, a plurality of battery cells is assembled to form a battery module and then a plurality of battery modules is assembled to form a battery pack. The battery pack is finally mounted on an environmentally-friendly vehicle. This type of battery module satisfies a required voltage and capacity standard by stacking and bonding a predetermined number of battery cells and then assembling them.

However, when a plurality of battery cells is stacked, it is very important to manage a battery cell stacking alignment in order to ensure assembly quality of additional parts in a post-process, quality of electrical connection therebetween, and cooling performance. The battery cell includes a negative electrode plate, a positive electrode plate, and a separator interposed between the negative electrode plate and the positive electrode plate. The negative electrode plate is provided with a negative electrode lead, and the positive electrode plate is provided with a positive electrode lead. This battery cell is surrounded by a pouch in a structure in which the negative electrode plate, the separator, and the positive electrode plate are sequentially stacked, that is, in a form of a jelly roll.

As shown in FIG. 1, a conventional art measures, by photographing with a vision camera 4, a gap between a negative electrode plate 1, a separator 2, and a positive electrode plate 3 in a state where the negative electrode plate, the separator, and the positive electrode plate are stacked in order to inspect an alignment state of the negative electrode plate, the separator, and the positive electrode plate of the battery cell. Sharpness of an edge decreases according to intensity of illumination and dispersion of process so that there is a possibility that an error in inspection of electrode alignment of the battery cell occurs when the gap between the negative electrode plate, the separator, and the positive electrode plate is measured.

Further, a noise is generated due to vibration of equipment such as a stack table 5 when the electrode alignment of the battery cell is inspected. The noise causes the error in the inspection of electrode alignment of the battery cell. Therefore, it is desired to select a shooting position for the electrode plate and the separator from which the noise is removed before the electrode alignment of the battery cell is inspected.

The above information disclosed in this Background section is provided only to enhance understanding of the background of the present disclosure. Therefore, it may contain information that does not form the prior art that is already known to a person of ordinary skill in the art.

SUMMARY

The present disclosure has been made in an effort to provide a method and a device for inspecting electrode alignment of a battery cell. The method and device measure the electrode alignment by synthesizing a stacked image of a negative electrode plate and a separator of the battery cell and a stacked image of a positive electrode plate of the battery cell and the separator and by removing a vibration noise before the stacked images are synthesized to correct the stacked images so that the electrode alignment of the battery cell may be accurately inspected.

An embodiment of the present disclosure provides the method for inspecting electrode alignment of the battery cell to inspect an alignment state of a jelly roll including the negative electrode plate, the positive electrode plate, and the separator of the battery cell. The method includes: supplying the separator to fix both portions of the separator to a stack table using a first gripper and a second gripper; rotating the stack table to face one side; stacking the negative electrode plate on the separator; fixing the negative electrode plate on the separator by the first gripper after the first gripper is released; and obtaining a first image by photographing the negative electrode plate stacked on the separator and by calculating a position of the negative electrode plate. The method further includes: rotating the stack table to face the other side opposite to the one side and supplying the separator on the negative electrode plate after the second gripper is released; stacking the positive electrode plate on the separator; fixing the positive electrode plate on the separator by the second gripper; obtaining a second image by photographing the positive electrode plate stacked on the separator and by calculating a position of the positive electrode plate and a position of the separator; synthesizing the first image and the second image; and calculating a gap between the negative electrode plate, the positive electrode plate, and the separator by the synthesized first image and second image.

In another embodiment, obtaining the first image may include: photographing the negative electrode plate stacked on the separator by a first camera and a second camera installed to face the same axial direction as the negative electrode plate stacked on the separator.

In another embodiment, obtaining the second image may include: photographing the positive electrode plate stacked on the separator by a third camera and a fourth camera installed to face the same axial direction as the positive electrode plate stacked on the separator at a side facing the first camera and the second camera with the stack table interposed therebetween.

In another embodiment, obtaining the first image may include calculating the position of the negative electrode plate. In particular, calculating the position of the negative electrode plate may include: photographing, by the first camera and the second camera, a horizontal edge and a vertical edge of the negative electrode plate; selecting two intersection points of the horizontal edge and the vertical edge of the negative electrode plate; substituting the two intersection points on a virtual calculation screen; substituting a pre-measured horizontal width of the negative electrode plate on the virtual calculation screen on which each of the two intersection points is substituted; and calculating a vertical width of the negative electrode plate by connecting the two intersection points to each other.

In another embodiment, obtaining the second image may include calculating the position of the positive electrode plate and the position of the separator. The calculating the position of the positive electrode plate and the position of the separator may include: photographing, by the third camera and the fourth camera, a horizontal edge and a vertical edge of the positive electrode plate and a horizontal edge of the separator; selecting two intersection points of the horizontal edge and the vertical edge of the photographed positive electrode plate; substituting the two intersection points on a virtual calculation screen; substituting a pre-measured horizontal width of the positive electrode plate on the virtual calculation screen on which each of the two intersection points is substituted; connecting the two intersection points to each other so that a vertical width of the positive electrode plate is calculated; and calculating a vertical width of the separator by substituting a vertical gap between the separator and the positive electrode plate on the virtual calculation screen.

In another embodiment, calculating the gap between the negative electrode plate, the positive electrode plate, and the separator may include measuring a first gap in a vertical direction between the negative electrode plate and the separator, a second gap in the vertical direction between the positive electrode plate and the separator, a third gap in a horizontal direction between the negative electrode plate and the positive electrode plate, and a fourth gap in the vertical direction between the negative electrode plate and the positive electrode plate.

The first gap may be measured at two points, the second gap may be measured at two points, the third gap may be measured at four points, and the fourth gap may be measured at four points.

The method for inspecting electrode alignment of the battery cell may further include, after the first image is obtained and the second image is obtained, correcting a position of the first image and a position of the second image to a predetermined reference position.

In another embodiment, correcting the position of the first image and the position of the second image may include moving the position of the first image and the second image by a difference between positions of the first image and the second image that are obtained by actual photographing and a master position. The master position may be a position of a reference hole that is registered in advance by photographing in a non-vibration state the reference hole formed in an outer area other than an area where the negative electrode plate, the positive electrode plate, and the separator are stacked at the stack table. The position of the first image and the position of the second image may be moved by the difference between the position of the reference hole photographed together when the first image and the second image are photographed and the master position.

On the other hand, an embodiment of the present disclosure provides the device for inspecting electrode alignment of the battery cell. The device includes: a stack table at which a negative electrode plate, a positive electrode plate, and a separator of the battery cell are loaded; a gripper that fixes the negative electrode plate, the positive electrode plate, and the separator to the stack table; a rotation driver that rotates the stack table; and a negative electrode plate photographing device that obtains a first image by photographing the negative plate and the separator. The device further includes: a positive electrode plate and separator photographing device that obtains a second image by photographing the positive electrode plate and the separator; and an image processor configured to calculate a position of the negative electrode plate, a position of the positive electrode plate, and a position of the separator by synthesizing the first image and the second image and to calculate a gap between the negative electrode plate, the positive electrode plate, and the separator.

The negative electrode plate photographing device may include a first camera and a second camera that are installed to face the same axial direction as the negative electrode plate and the separator stacked on the stack table.

The positive electrode plate and separator photographing device may include a third camera and a fourth camera that are installed to face the same axial direction as the positive electrode plate and the separator stacked on the stack table at a side facing the first camera and the second camera with the stack table interposed therebetween.

The rotation driver may be configured to axially rotate the stack table so that a surface of the stack table faces the negative electrode plate photographing device or the positive electrode plate and separator photographing device.

The gripper may include: a first gripper that fixes the negative electrode plate on the separator; and a second gripper that fixes the positive electrode plate on the separator.

The gripper may move up and down in a direction perpendicular to the negative electrode plate and the positive electrode plate by a servo motor, and may move forward and backward in a direction of ends of the negative electrode plate and the positive electrode plate by the servo motor.

A penetration hole and a penetration groove may be formed in the gripper so that a horizontal edge and a vertical edge of the negative electrode plate and a horizontal edge and a vertical edge of the positive electrode plate are exposed when the negative electrode plate and the positive electrode plate are fixed on the separator.

A reference hole positioned in an outer area other than an area where the negative electrode plate, the positive electrode plate, and the separator are stacked may be formed in the stack table.

According to the present disclosure, it is possible to determine the alignment of the positive electrode plate and the negative electrode plate in real time by synthesizing the stacked image of the negative electrode plate and the separator and the stacked image of the positive electrode plate and the separator. Further, it is possible to prevent a folding defect in a region of the separator to improve manufacturing quality and reduce manufacturing cost.

In addition, it is possible to inspect the electrode alignment after removing the noise in consideration of an interlocking state of equipment and the vibration of the equipment to reduce a possibility of false-determination and improve inspection reliability.

In addition, since it is possible to inspect the electrode alignment in real time, it is possible to reduce cost of sampling inspection disposal to increase production efficiency and strengthen product stability.

In addition, since the same inspection method may be applied to various jelly roll manufacturing methods such as folding, stacking, and the like, applicability of the present disclosure is improved, and commonality thereof is enhanced.

DETAILED DESCRIPTION

Figure 1:
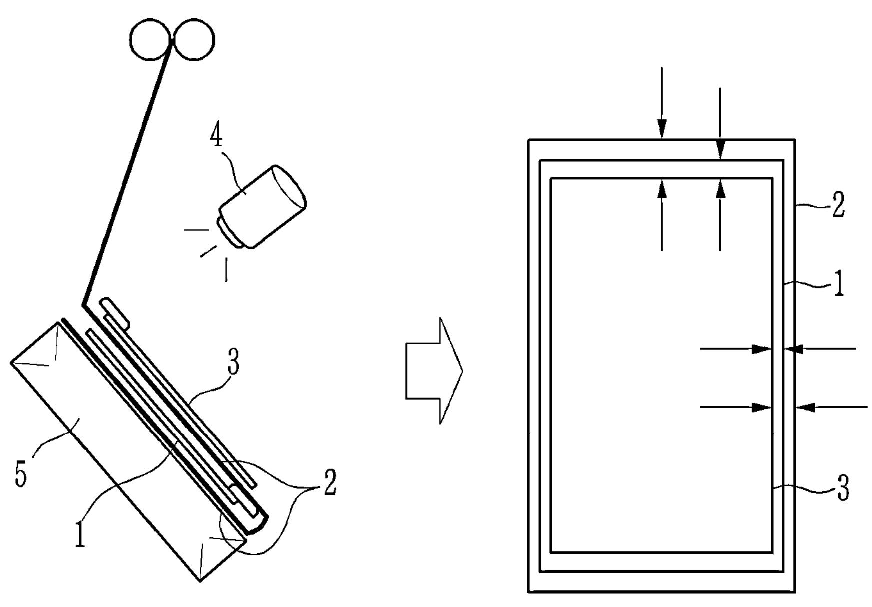
FIG. 1 is a conceptual view showing a battery cell electrode alignment inspection method according to a conventional art.

The present disclosure is described more fully hereinafter with reference to the accompanying drawings, in which embodiments of the present disclosure are shown. As those having ordinary skill in the art would realize, the described embodiments may be modified in various different ways, all without departing from the spirit or scope of the present disclosure.

Further, with embodiments of the present disclosure, detailed description is made as to the constituent elements in a first embodiment with reference to the relevant drawings by using the same reference numerals for the same constituent elements, while only the constituent elements different from those related to the first embodiment are described in other embodiments.

The drawings are schematic and are not illustrated in accordance with a scale. Relative dimensions and ratios of portions in the drawings are illustrated to be exaggerated or reduced in size for clarity and convenience, and the dimensions are just examples and are not limiting. In addition, like structures, elements, or components illustrated in two or more drawings use same reference numerals for showing similar features. It should be understood that when an element such as a layer, film, region, area, or substrate is referred to as being "on" another element, it can be directly on the other element or intervening elements may also be present.

When a component, device, element, or the like of the present disclosure is described as having a purpose or performing an operation, function, or the like, the component, device, or element should be considered herein as being "configured to" meet that purpose or to perform that operation or function.

The present disclosure shows embodiments in detail. As a result, various modifications of the drawings should be expected. Therefore, the embodiments are not limited to a specific shape of an illustrated region, but, for example, include a change in the shape in accordance with manufacturing.

Hereinafter, a method for inspecting electrode alignment of a battery cell according to an embodiment of the present disclosure is described with reference to FIG. 2 through FIG. 6.

Figure 2:
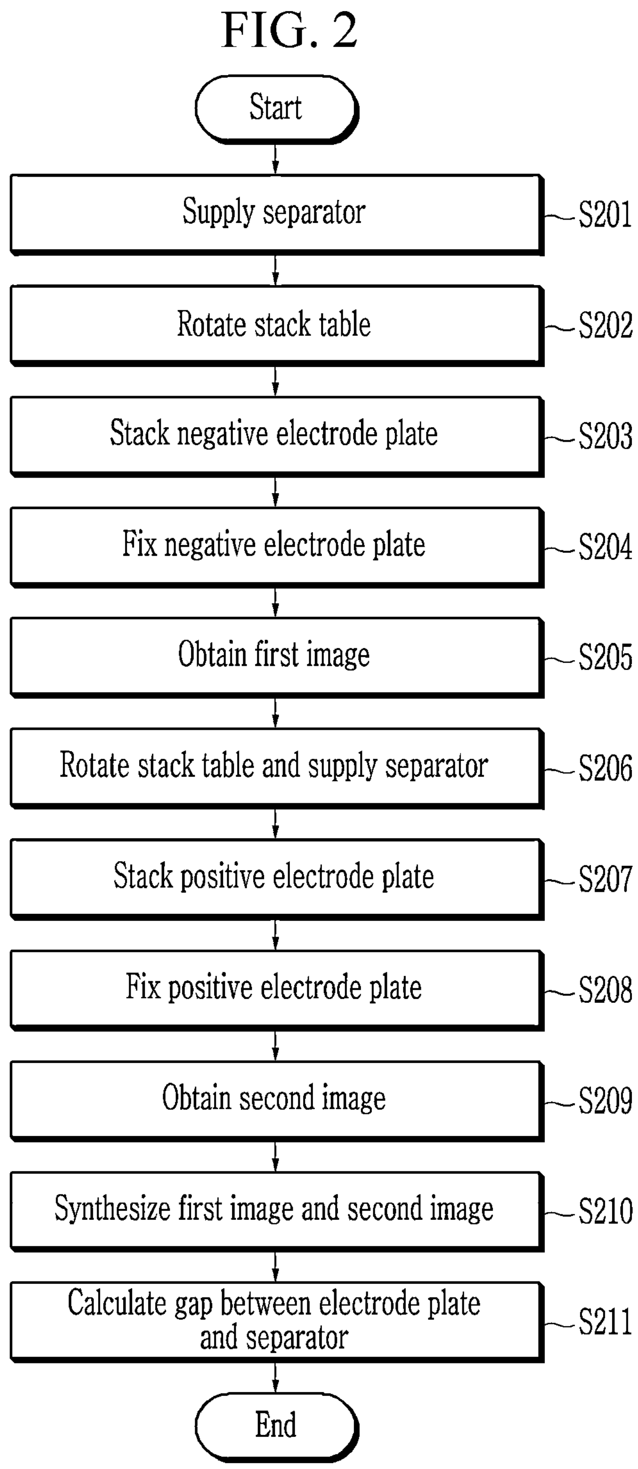
FIG. 2 is a flowchart showing a method for inspecting electrode alignment of a battery cell according to an embodiment of the present disclosure.
Figure 3:
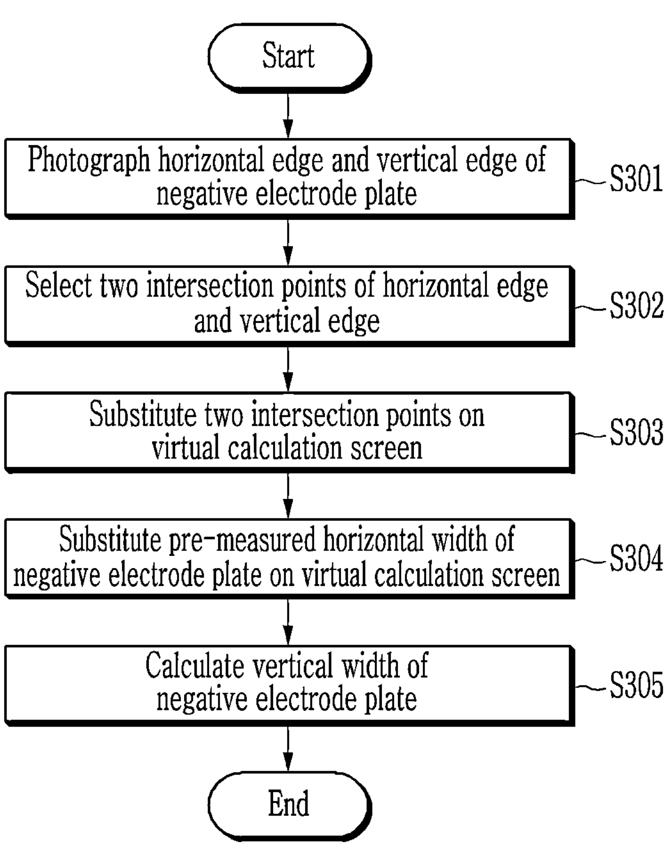
FIG. 3 is a flowchart showing a step of calculating a position of a negative electrode plate by acquiring a first image in the method for inspecting electrode alignment of the battery cell according to the embodiment of the present disclosure.
Figure 4:
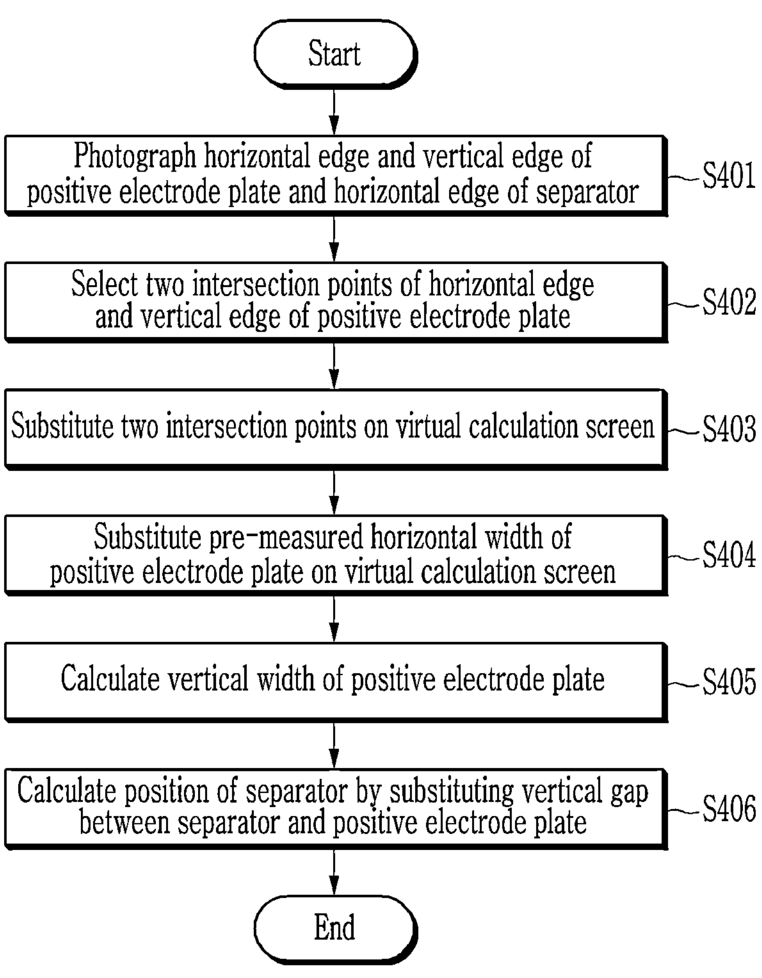
FIG. 4 is a flowchart showing a step of calculating a position of a positive electrode plate and a position of a separator by acquiring a second image in the method for inspecting electrode alignment of the battery cell according to the embodiment of the present disclosure.

FIG. 2 is a flowchart showing a method for inspecting electrode alignment of a battery cell according to an embodiment of the present disclosure. FIG. 3 is a flowchart showing a step of calculating a position of a negative electrode plate by acquiring a first image in the method for inspecting electrode alignment of the battery cell according to the embodiment of the present disclosure. FIG. 4 is a flowchart showing a step of calculating a position of a positive electrode plate and a position of a separator by acquiring a second image in the method for inspecting electrode alignment of the battery cell according to the embodiment of the present disclosure. FIGS. 5A-5F are conceptual diagrams illustrating a state in which a negative plate and a separator are photographed to obtain a first image in a method for inspecting electrode alignment of a battery cell according to the embodiment of the present disclosure. FIGS. 6A-6D are conceptual views showing a state in which a positive electrode plate and a separator are photographed to obtain a second image in the method for inspecting electrode alignment of the battery cell according to the embodiment of the present disclosure.

Figure 5A:
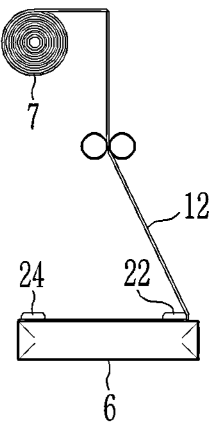
FIGS. 5A-5F are conceptual diagrams illustrating a state in which a negative plate and a separator are photographed to obtain a first image in a method for inspecting electrode alignment of a battery cell according to the embodiment of the present disclosure.
Figure 5B:
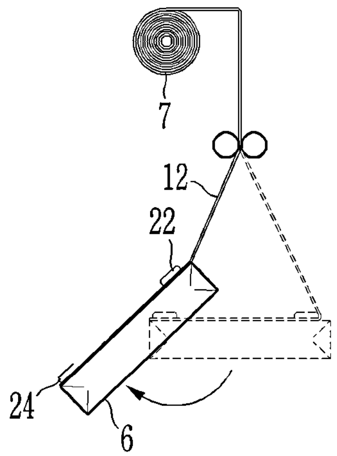

Referring to FIG. 2, FIGS. 5A-5F, and FIGS. 6A-6D, the method for inspecting electrode alignment of the battery cell according to the embodiment of the present disclosure is a method for inspecting an alignment state of a jelly roll including the negative electrode plate 30, the positive electrode plate 40, and the separator 12 of the battery cell. First, the method for inspecting electrode alignment of the battery cell supplies the separator 12 on a stack table 6 using a separator supply device 7, and fixes both portions (or regions) of the separator 12 to the stack table 6 (S201) (FIG. 5A). Both the portions of the separator 12 may be fixed to the stack table 6 by a first gripper 22 and a second gripper 24.

Figure 5C:
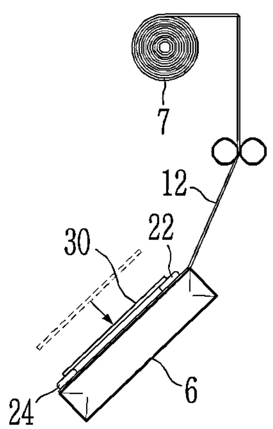

Then, a top surface (or an upper surface) of the stack table 6 is obliquely rotated to face one side (S202) (FIG. 5B), and the negative electrode plate 30 is stacked on the separator 12 (S203) (FIG. 5C).

Figure 5D:
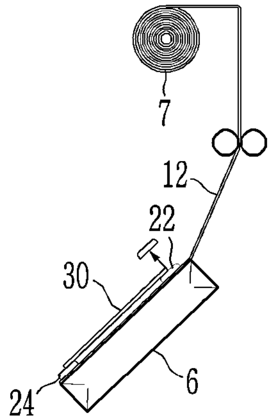
Figure 5E:
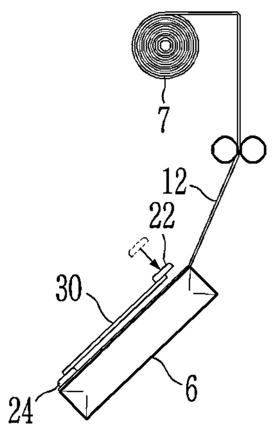
Figure 7A:
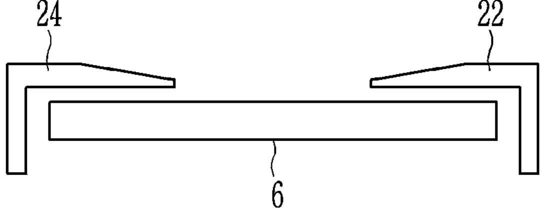
FIGS. 7A-7C are views showing an operation of a gripper of a device for inspecting electrode alignment of the battery cell according to an embodiment of the present disclosure.
Figure 7B:
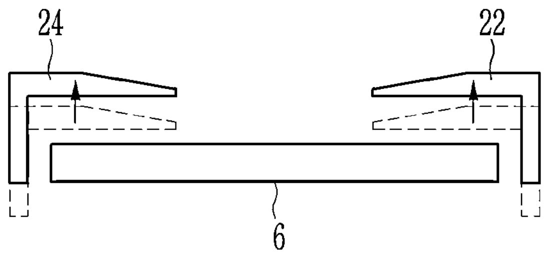
Figure 7C:
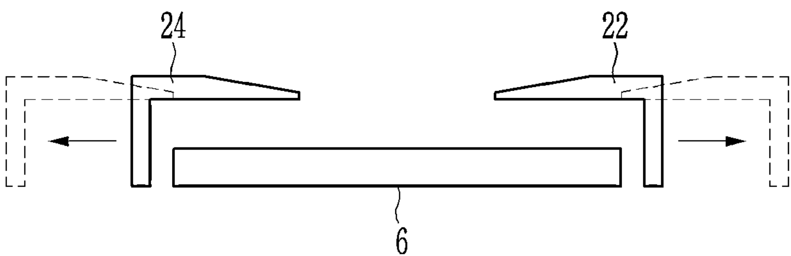

After the first gripper 22 is released, the negative electrode plate 30 is fixed on the separator 12 by the first gripper 22 (S204) (FIG. 5D and FIG. 5E). In this case, as shown in FIGS. 7A-7C, the first gripper 22 and the second gripper 24 may be disposed at both the portions of the stack table 6 in a form that covers the top surface and a side surface of the stack table 6.

The first gripper 22 and the second gripper 24 may be released from the stack table 6 by moving in an upward direction perpendicular to the top surface of the stack table 6 and then moving in a direction away from the side surface of the stack table 6. In a released state, the first gripper 22 and the second gripper 24 may be fixed to the stack table 6 by moving in a direction closer to the side surface of the stack table 6 and then moving in a downward direction perpendicular to the top surface of the stack table 6. The negative electrode plate 30, the positive electrode plate 40, and the separator 12 may be stacked between the top surface of stack table 6 and the first gripper 22 and the second gripper 24.

Figure 5F:
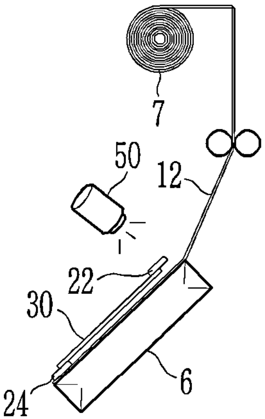

Then, the stacked negative electrode plate 30 and separator 12 are photographed, and the position of the negative electrode plate 30 is calculated to obtain the first image (S205) (FIG. 5F). In one embodiment, photographing the negative electrode plate 30 stacked on the separator 12 may be performed by a negative electrode plate photographing device 50 (e.g., a first camera 52 and a second camera 54 of FIG. 8) installed to face the same axial direction as the negative electrode plate 30 and the separator 12.

Figure 6A:
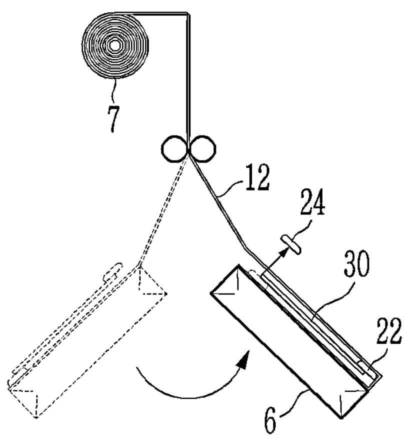
FIGS. 6A-6D are conceptual views showing a state in which a positive electrode plate and a separator are photographed to obtain a second image in the method for inspecting electrode alignment of the battery cell according to the embodiment of the present disclosure.
Figure 6B:
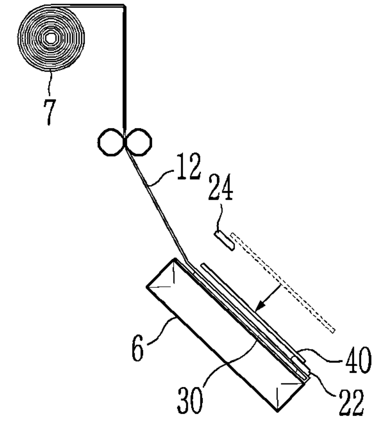

Then, the stack table 6 is obliquely rotated to face the other side opposite to the one side. After the second gripper 24 is released, the separator 12 is supplied on the negative electrode plate 30 (S206) (FIG. 6A). Then, the positive electrode plate 40 is stacked on the separator 12 (S207) (FIG. 6B).

Figure 6C:
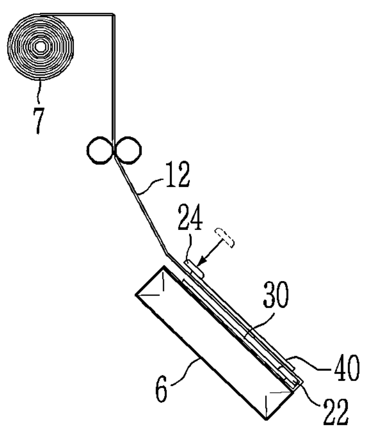

In step S208, the positive electrode plate 40 is fixed on the separator 12 by the second gripper 24 (FIG. 6C).

Figure 6D:
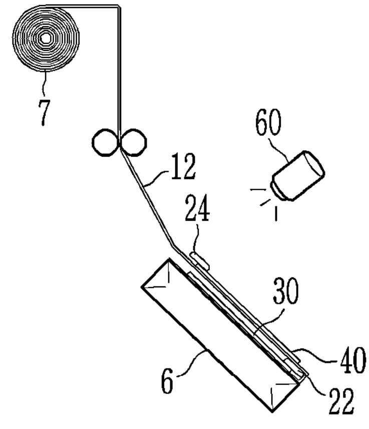

Then, the positive electrode plate 40 stacked on the separator 12 is photographed, and the position of the positive electrode plate 40 and the position of the separator 12 are calculated to obtain the second image (S209) (FIG. 6D). In this case, photographing of the positive electrode plate 40 stacked on the separator 12 may be performed by a positive electrode plate and separator photographing device 60 (e.g., a third camera 62 and a fourth camera 64 of FIG. 8) installed to face the same axial direction as the positive electrode plate 40 and the separator 12. The third camera 62 and the fourth camera 64 may be disposed at a side facing the first camera 52 and the second camera 54 with the stack table 6 interposed therebetween.

In step S210, the obtained first image and the obtained second image are synthesized, and a gap between the negative electrode plate 30, the positive electrode plate 40, and the separator 12 is calculated by the synthesized first image and second image (S211).

Figure 13:
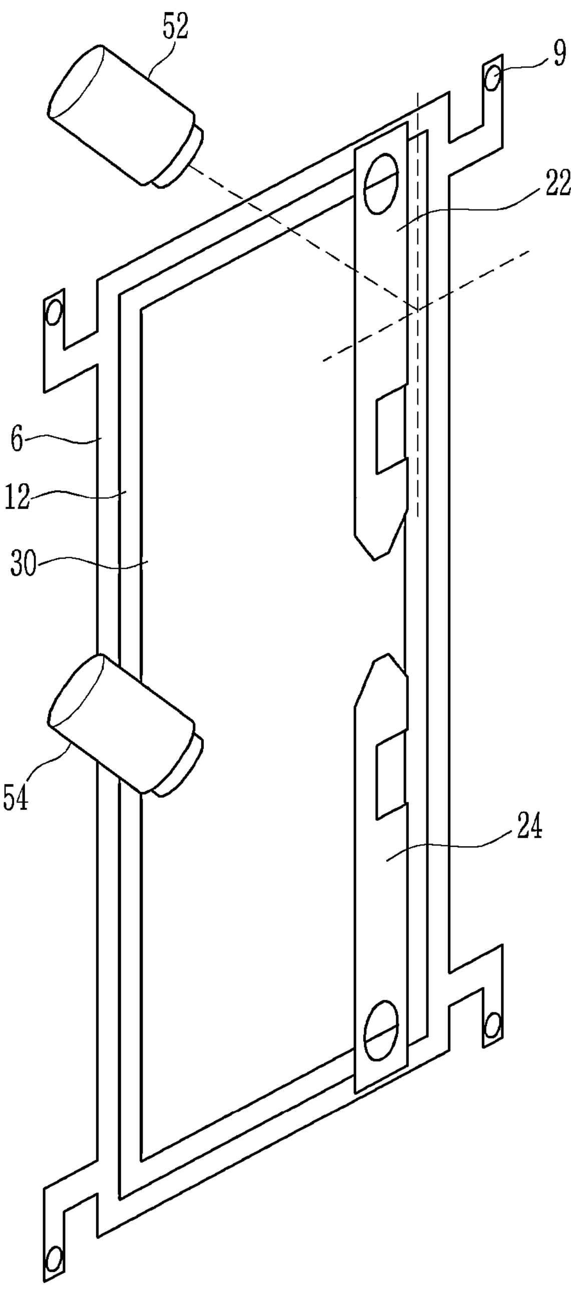
FIG. 13 is a view showing the appearance that photographs the negative electrode plate and the separator to obtain the first image in the device for inspecting electrode alignment of the battery cell according to the embodiment of the present disclosure.
Figure 15:
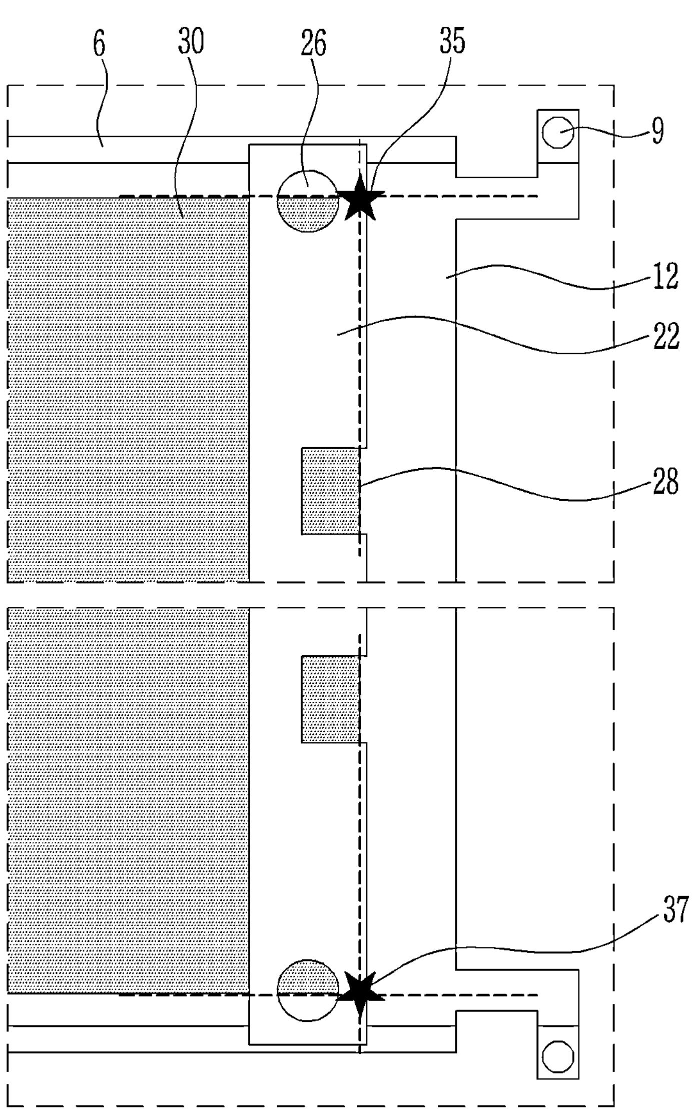
FIG. 15 is a view showing an appearance that selects an intersection point to calculate the position of the negative electrode plate in the method for inspecting electrode alignment of the battery cell according to the embodiment of the present disclosure.
Figure 16:
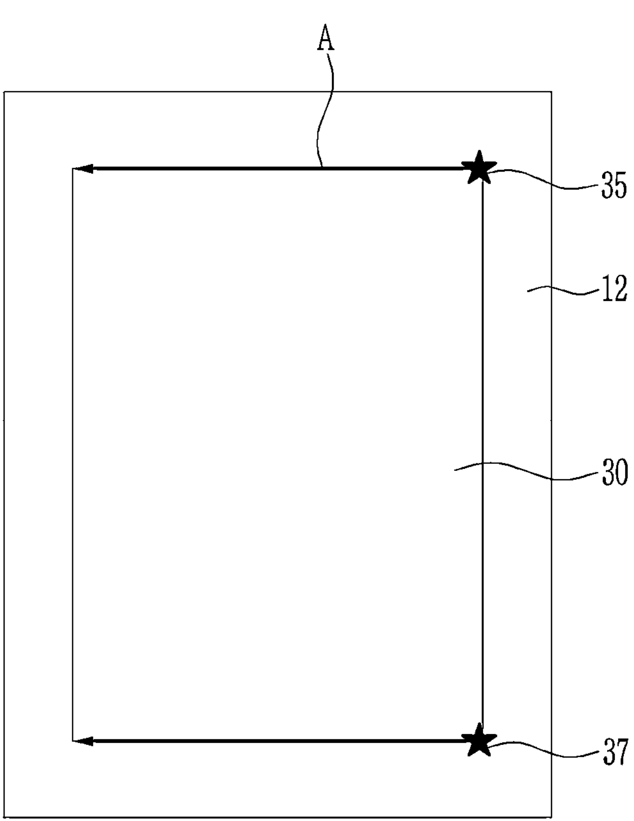
FIG. 16 is a view showing an appearance that calculates the position of the negative electrode plate by substituting the intersection point on a virtual calculation screen in the method for inspecting electrode alignment of the battery cell according to the embodiment of the present disclosure.

FIG. 3 is a flowchart showing a step of calculating the position of the negative electrode plate by obtaining the first image in the method for inspecting electrode alignment of the battery cell according to the embodiment of the present disclosure. FIG. 13 is a view showing the appearance in which the negative electrode plate and the separator are photographed to obtain the first image in a device for inspecting electrode alignment of the battery cell according to an embodiment of the present disclosure. FIG. 15 is a view showing an appearance in which an intersection point is selected to calculate the position of the negative electrode plate in the method for inspecting electrode alignment of the battery cell according to the embodiment of the present disclosure. FIG. 16 is a view showing calculation of the position of the negative electrode plate by substituting the intersection point on a virtual calculation screen in the method for inspecting electrode alignment of the battery cell according to the embodiment of the present disclosure.

Referring to FIGS. 3, 13, 15 and 16, in order to calculate the position of the negative electrode plate 30 in the step S205 of obtaining the first image, first, a horizontal edge and a vertical edge of the negative electrode plate 30 are photographed by the first camera 52 and the second camera 54 (S301) (FIG. 13). The first camera 52 and the second camera 54 are installed to face a coaxial direction with the negative electrode plate 30 and the separator 12 stacked on the stack table 6 that is obliquely rotated, and the horizontal edge and the vertical edge are photographed at both sides of the negative electrode plate 30 so that two intersection points 35 and 37 of the horizontal edge and the vertical edge of the negative electrode plate 30 are selected in step S302 (FIG. 15).

In this case, a penetration hole 26 and a penetration groove 28 are formed in the first gripper 22 and the second gripper 24 so that the horizontal edge and the vertical edge of the negative electrode plate 30 are exposed.

In step S303, the selected two intersection points 35 and 37 are substituted on the virtual calculation screen (FIG. 16).

In step S304, a pre-measured horizontal width of the negative electrode plate 30 is substituted on the virtual calculation screen on which each of the two intersection points 35 and 37 is substituted. In one form, the pre-measured horizontal width of the negative electrode plate 303 may be previously measured and obtained prior to performing the method for inspecting electrode alignment of the battery cell according to the present disclosure.

Then, the vertical width of the negative electrode plate 30 is calculated by connecting the two intersection points 35 and 37 to each other (S305).

Accordingly, the position of the negative electrode plate 30 may be set on the virtual calculation screen, and the first image may be obtained.

Figure 14:
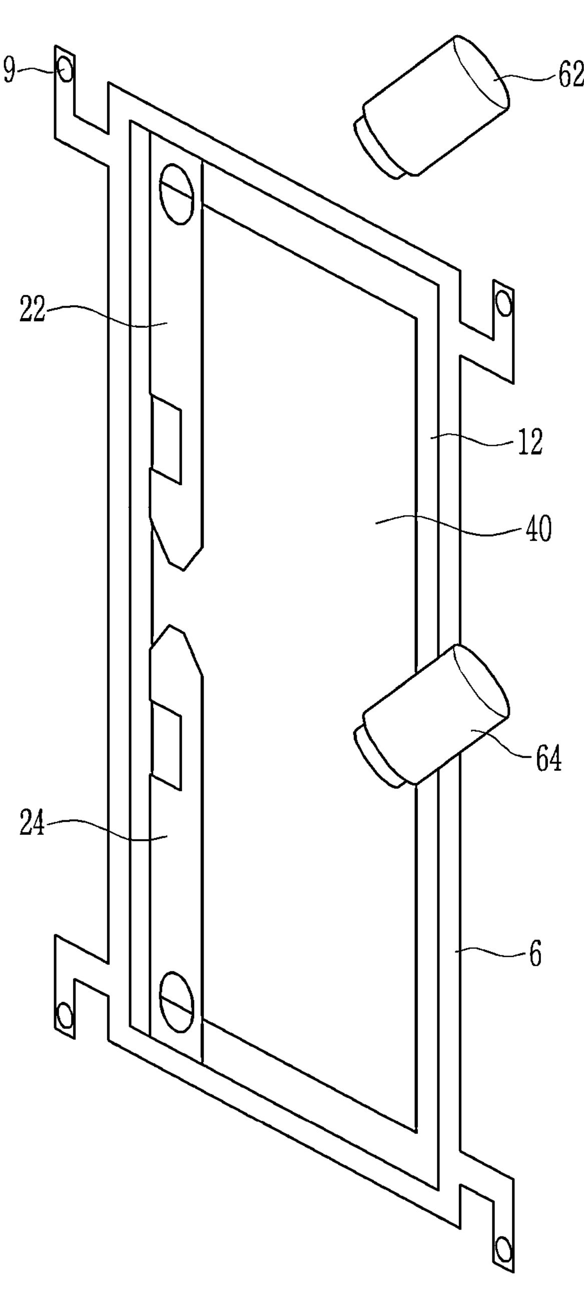
FIG. 14 is a view showing the appearance that photographs the positive electrode plate and the separator to obtain the second image in the device for inspecting electrode alignment of the battery cell according to the embodiment of the present disclosure.
Figure 17:
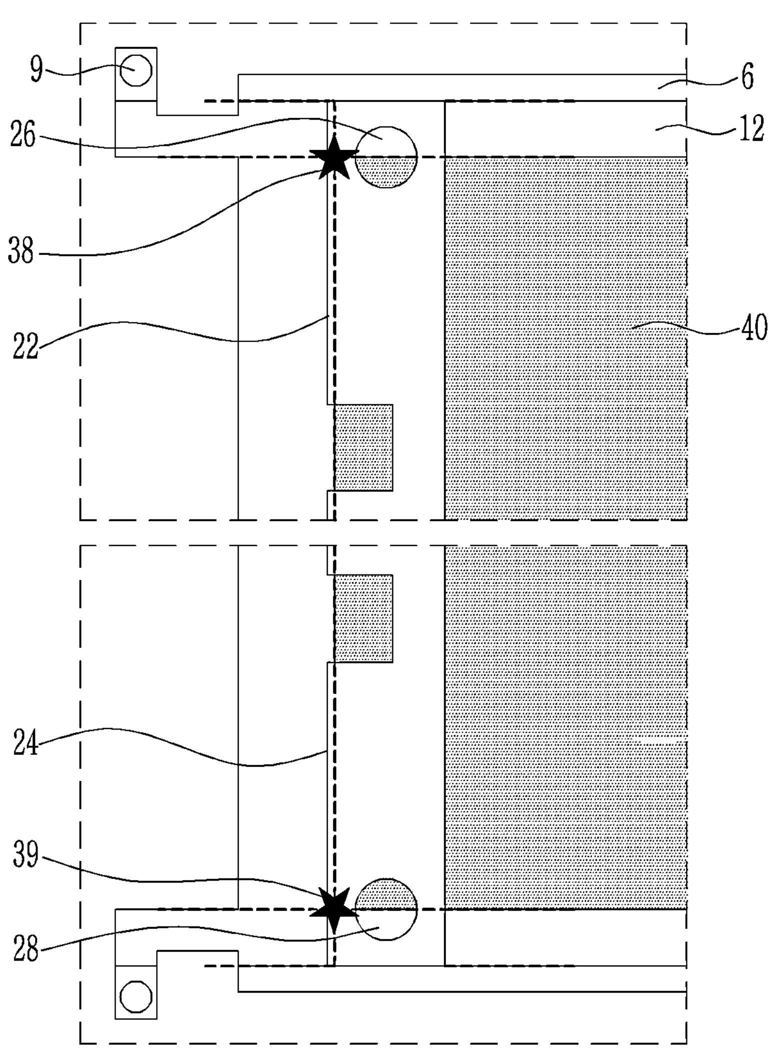
FIG. 17 is a view showing an appearance that selects an intersection point to calculate the position of the positive electrode plate and the position of the separator in the method for inspecting electrode alignment of the battery cell according to the embodiment of the present disclosure.
Figure 18:
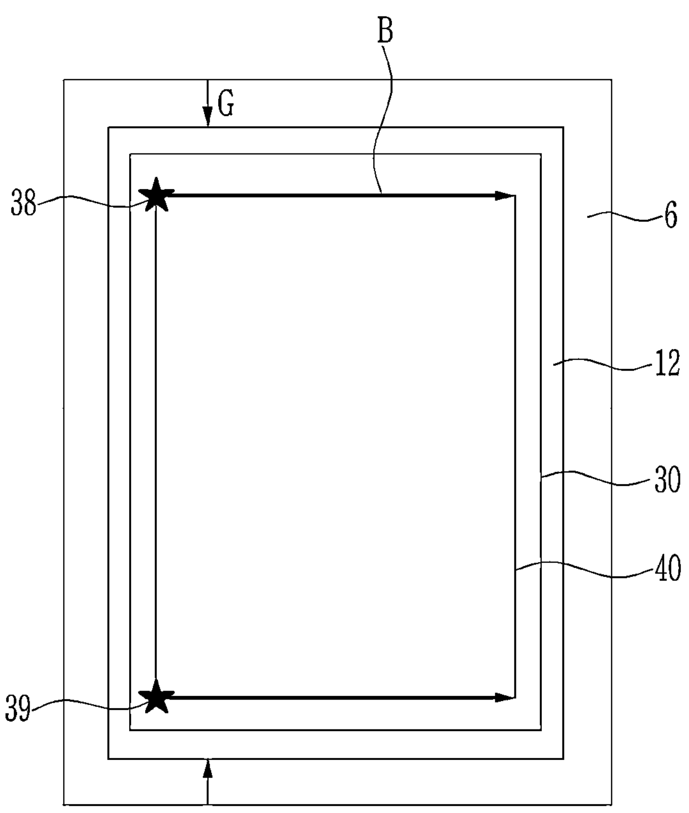
FIG. 18 is a view showing an appearance that calculates the position of the positive electrode plate and the position of the separator by substituting the intersection point on a virtual calculation screen in the method for inspecting electrode alignment of the battery cell according to the embodiment of the present disclosure.

On the other hand, FIG. 4 is the flowchart showing the step of calculating the position of the positive electrode plate and the position of the separator by obtaining the second image in the method for inspecting electrode alignment of the battery cell according to the embodiment of the present disclosure. FIG. 14 is a view showing the appearance the positive electrode plate and the separator are photographed to obtain the second image in the device for inspecting electrode alignment of the battery cell according to the embodiment of the present disclosure. FIG. 17 is a view showing an appearance in which an intersection point is selected to calculate the position of the positive electrode plate and the position of the separator in the method for inspecting electrode alignment of the battery cell according to the embodiment of the present disclosure. FIG. 18 is a view showing an appearance in which the position of the positive electrode plate and the position of the separator are calculated by substituting the intersection point on the virtual calculation screen in the method for inspecting electrode alignment of the battery cell according to the embodiment of the present disclosure.

Referring to FIGS. 4, 14, 17 and 18, in order to calculate the position of the positive electrode plate 40 and the position of the separator 12 in the step S209 of obtaining the second image, first, a horizontal edge and a vertical edge of the positive electrode plate 40 and a horizontal edge of the separator 12 are photographed by the third camera 62 and the fourth camera 64 (S401) (FIG. 14). After the first image is obtained, the stack table 6 is rotated to face the third camera 62 and the fourth camera 64 installed on the side facing the first camera 52 and the second camera 54, and the positive electrode plate 40 and separator 12 are photographed. The third camera 62 and the fourth camera 64 are installed to face a coaxial direction with the positive electrode plate 40 and the separator 12 stacked on the stack table 6, and the horizontal edge and the vertical edge of the positive electrode plate 40 and the horizontal edge of the separator 12 are photographed at both sides of the positive electrode plate 40. Then, two intersection points 38 and 39 of the horizontal edge and the vertical edge of the positive electrode plate 40 are selected (S402) (FIG. 17).

The penetration hole 26 and the penetration groove 28 are formed in the first gripper 22 and the second gripper 24 so that the horizontal edge and the vertical edge of the positive electrode plate 40 are exposed.

In step S403, the selected two intersection points 38 and 39 are substituted on the virtual calculation screen (FIG. 18).

In step S404, a pre-measured horizontal width of the positive electrode plate 40 is substituted on the virtual calculation screen on which each of the two intersection points 38 and 39 is substituted. In this case, the pre-measured horizontal width of the positive electrode plate 40 may be previously measured and obtained prior to performing the method for inspecting electrode alignment of the battery cell according to the present disclosure.

Then, the two intersection points 38 and 39 are connected to each other so that the vertical width of the positive electrode plate 40 is calculated (S405).

Then, a vertical width of the separator 12 is calculated by substituting a vertical gap "G" between the separator 12 and the positive electrode plate 40 on the virtual calculation screen (S406). In this case, the vertical gap between the separator 12 and the positive electrode plate 40 may be previously measured and obtained prior to performing the method for inspecting electrode alignment of the battery cell according to the present disclosure.

Accordingly, the position of the positive electrode plate 40 and the position of the separator 12 may be set on the virtual calculation screen, and the second image may be obtained.

The obtained first image and the obtained second image are synthesized on the virtual calculation screen (S210), and the gap between the negative electrode plate 30, the positive electrode plate 40, and the separator 12 is calculated using the synthesized first image and second image (S211).

Figure 19A:
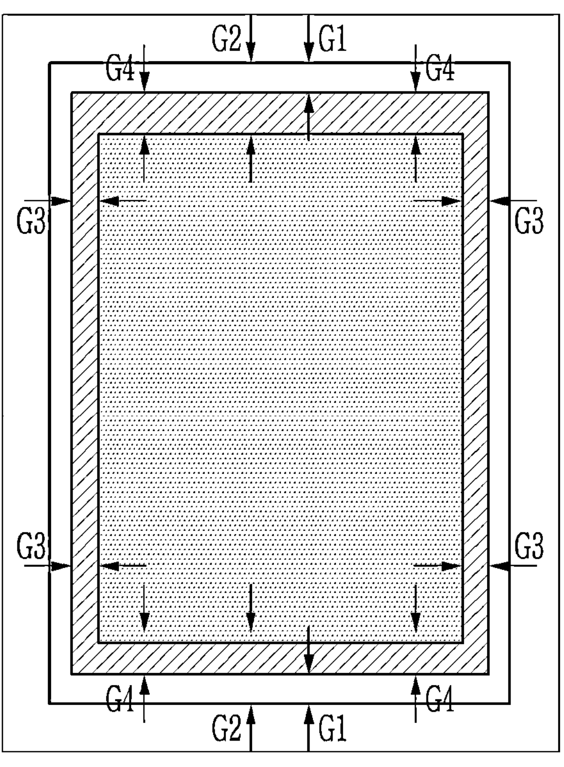
FIGS. 19A-19B are views showing a state in which a gap between a negative electrode plate, a positive electrode plate, and a separator is calculated in the method for inspecting electrode alignment of the battery cell according to the embodiment of the present disclosure.
Figure 19B:
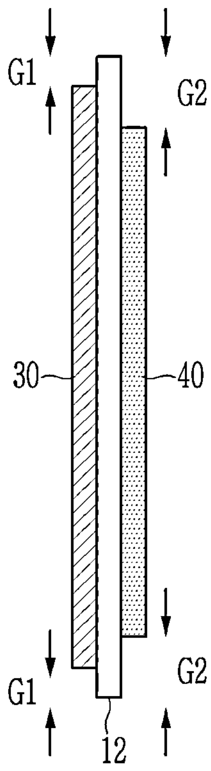

FIGS. 19A-19B are views showing a state in which a gap between a negative electrode plate, a positive electrode plate, and a separator is calculated in the method for inspecting electrode alignment of the battery cell according to the embodiment of the present disclosure.

Referring to FIGS. 19A-19B, in the step S211 of calculating the gap between the negative electrode plate, the positive electrode plate, and the separator according to the present disclosure in the first image and the second image synthesized on the virtual calculation screen, a first gap "G1" in a vertical direction between the negative electrode plate 30 and the separator, a second gap "G2" in the vertical direction between the positive electrode plate and the separator, a third gap "G3" in a horizontal direction between the negative electrode plate 30 and the positive electrode plate 40, and a fourth gap "G4" in the vertical direction between the negative electrode plate 30 and the positive electrode plate 40 may be measured.

In this case, the first gap G1 and the second gap G2 may be measured at two points that include an upper point and a lower point, the third gap G3 may be measured at four points (e.g., two left points and two right points), and the fourth gap G4 may be measured at four points that includes two upper points and two lower points.

The first image acquisition (S205), the second image acquisition (S209), the synthesis of the first image and the second image (S210), and the gap calculation (S211) are performed for each cycle of stacking of the separator 12, the negative electrode plate 30, the separator 12, and the positive electrode plate 40, and a gap calculation result in each cycle may be derived. If a different value is derived among values corresponding to the gap calculation result in each cycle, it is determined in real time that alignment of the jelly roll in the cycle is faulty and immediate response to the fault is possible. Thus, production efficiency is increased and product stability is enhanced.

On the other hand, the method for inspecting electrode alignment of the battery cell according to the embodiment of the present disclosure may further include correcting a position of the first image and a position of the second image to a predetermined reference position after the step S205 of obtaining the first image and the step S209 of obtaining the second image.

FIGS. 20A-20E are views showing a state in which positions of a first image and a second image are corrected in the method for inspecting electrode alignment of the battery cell according to the embodiment of the present disclosure.

Referring to FIGS. 20A-20E, the step of correcting the position of the first image and the position of second image is a step of moving the position of the first image and the second image by a difference between positions of the first image and the second image that are obtained by actual photographing and a master position.

Figure 20A:
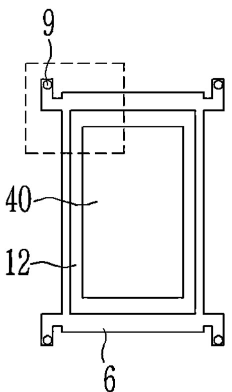
FIGS. 20A-20E are views showing a state in which positions of a first image and a second image are corrected in the method for inspecting electrode alignment of the battery cell according to the embodiment of the present disclosure.
Figure 20B:
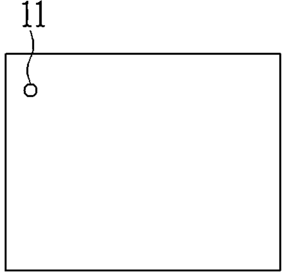
Figure 20C:
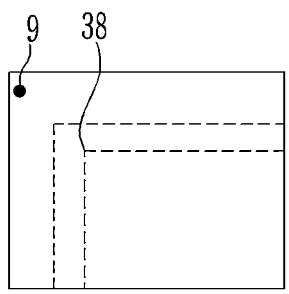

Taking the position correction when acquiring the second image as an example, a reference hole 9 positioned in an outer area other than an area where the negative electrode plate 30, the positive electrode plate 40, and the separator 12 are stacked may be formed in the stack table 6 (FIG. 20A), and the reference hole 9 is photographed in a non-vibration state so that the master position 11 is registered in advance (FIG. 20B).

Figure 20D:
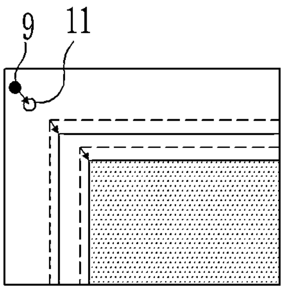
Figure 20E:
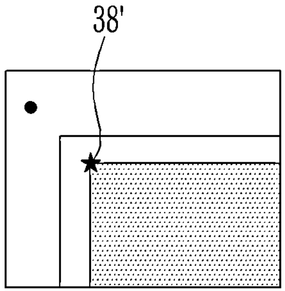

The reference hole 9 is photographed together when the second image is photographed, and if there is a difference between a position of the actually photographed reference hole 9 and the master position 11 (FIG. 20C), the position of the second image may be corrected by moving an entire position of the image by the difference (FIG. 20D). In this case, the intersection point 38 may be substituted on the virtual calculation screen as the corrected intersection point 38' (FIG. 20E).

The position correction when acquiring the first image may be performed in the same process as described above.

The position correction is performed when the first image is acquired and the second image is acquired, and the master position for the position correction of the first image and the master position for the position correction of the second image may be registered in advance.

Figure 8:
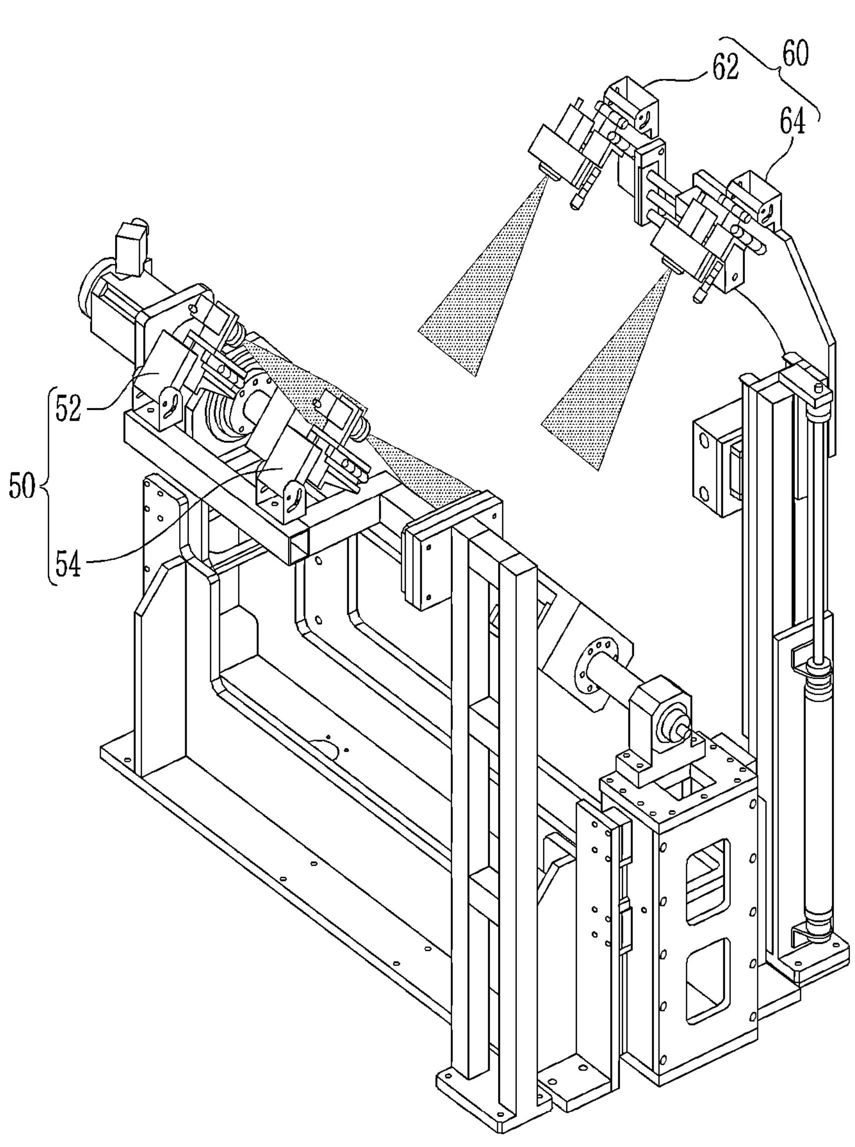
FIG. 8 is a perspective view showing the device for inspecting electrode alignment of the battery cell according to an embodiment of the present disclosure.
Figure 9:
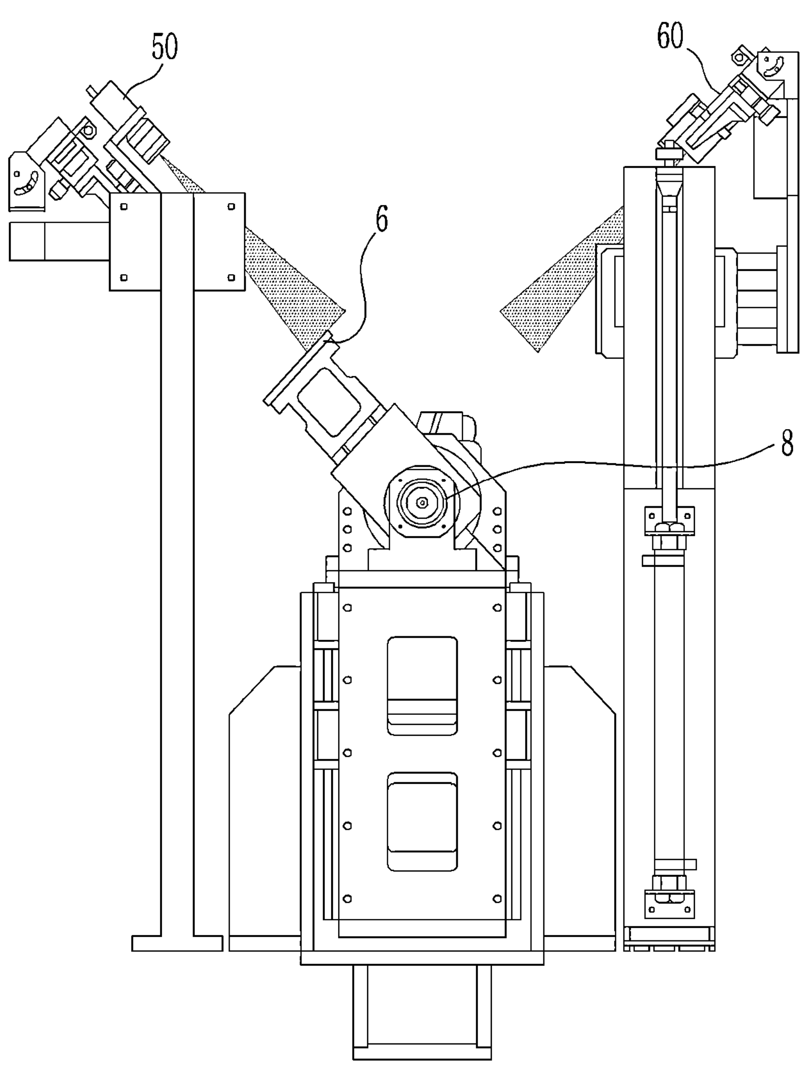
FIG. 9 is a front view of the device for inspecting electrode alignment of the battery cell according to the embodiment of the present disclosure.
Figure 10:
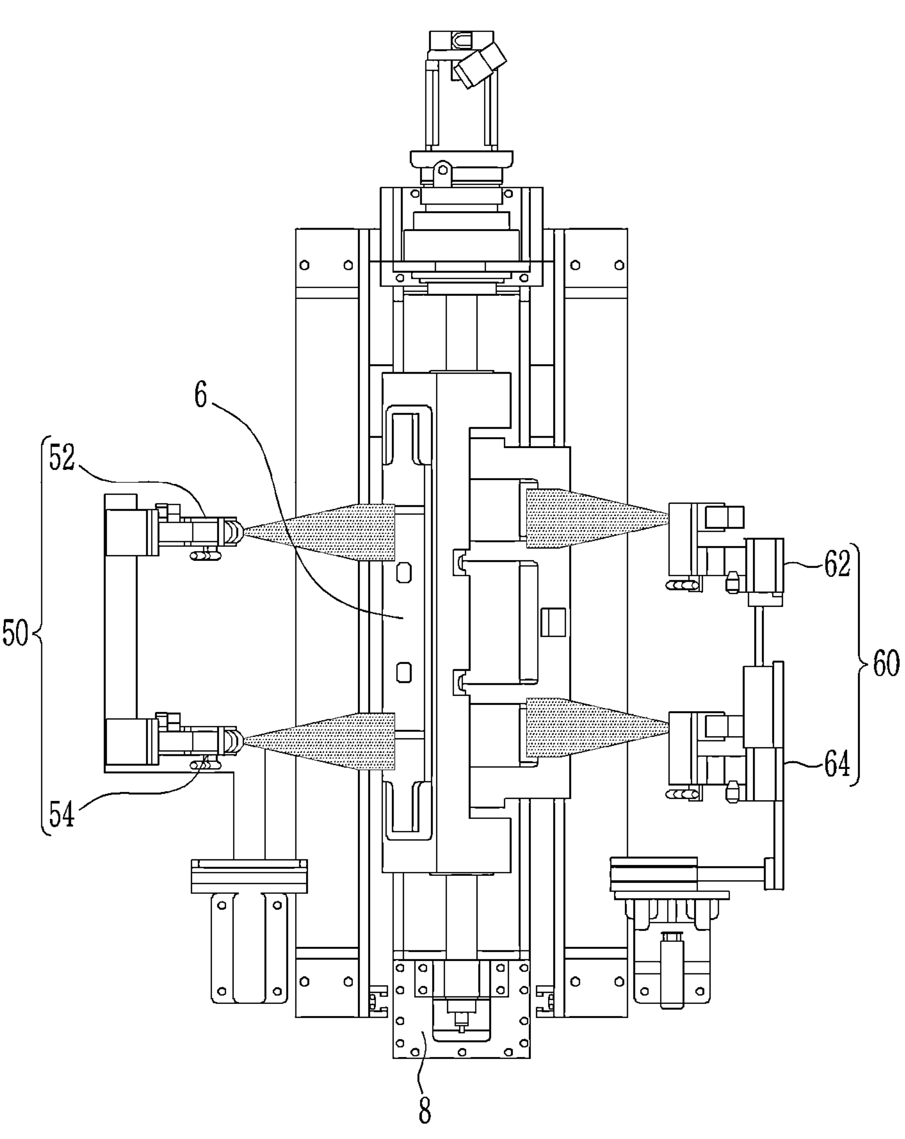
FIG. 10 is a view from a top of the device for inspecting electrode alignment of the battery cell according to the embodiment of the present disclosure.
Figure 11:
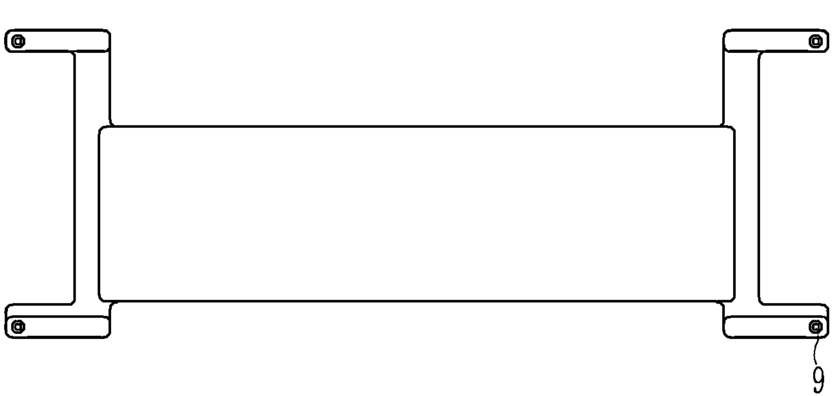
FIG. 11 is a view showing a stack table of the device for inspecting electrode alignment of the battery cell according to the embodiment of the present disclosure.
Figure 12:
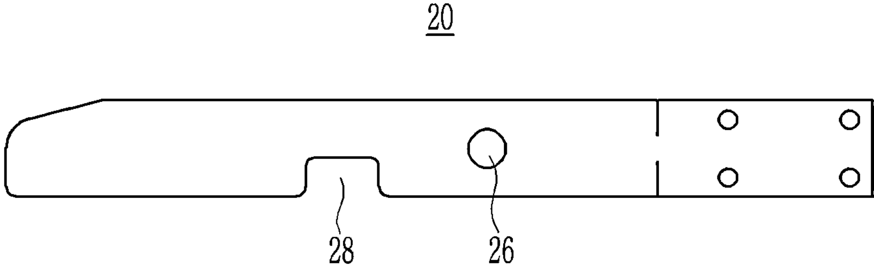
FIG. 12 is a view showing the gripper of the device for inspecting electrode alignment of the battery cell according to the embodiment of the present disclosure.

FIG. 8 is a perspective view showing the device for inspecting electrode alignment of the battery cell according to the embodiment of the present disclosure. FIG. 9 is a front view of the device for inspecting electrode alignment of the battery cell according to the embodiment of the present disclosure. FIG. 10 is a view from a top of the device for inspecting electrode alignment of the battery cell according to the embodiment of the present disclosure. FIG. 11 is a view showing a stack table of the device for inspecting electrode alignment of the battery cell according to the embodiment of the present disclosure. FIG. 12 is a view showing the gripper of the device for inspecting electrode alignment of the battery cell according to the embodiment of the present disclosure.

Referring to FIG. 8 through FIG. 12, the device for inspecting electrode alignment of the battery cell according to the embodiment of the present disclosure includes the stack table 6 at which the negative electrode plate 30, the positive electrode plate 40, and the separator 12 that are included in the battery cell are loaded (stacked), the gripper 20 that fixes the negative electrode plate 30, the positive electrode plate 40, and the separator 12 to the stack table 6, a rotation driver (or a rotation actuator) 8 that rotates the stack table 6, the negative electrode plate photographing device 50, the positive electrode plate and separator photographing device 60, and an image processor (not shown).

The stack table 6 may be axially rotated in an oblique direction to the left and right sides with respect to a bar shown in FIG. 9 by the rotation driver 8, and the negative electrode plate 30, the positive electrode plate 40, and the separator 12 may be loaded on the top surface of the stack table 6.

As shown in FIG. 11, the reference hole 9 positioned in the outer area other than the area where the negative electrode plate 30, the positive electrode plate 40, and the separator 12 are stacked may be formed in the stack table 6, and the reference hole 9 may be used to correct the position of the photographed first image and the position of the photographed second image.

The gripper 20 may include the first gripper 22 that fixes the negative electrode plate 30 on the separator 12 and the second gripper 24 that fixes the positive electrode plate 40 on the separator 12, and may be disposed at both portions of the stack table 6 in the form that covers the top surface and the side surface of the stack table 6. The first gripper 22 and the second gripper 24 may be fixed to or released from the top surface of the stack table 6 by moving the negative electrode plate 30, the positive electrode plate 40, and the separator 12 in a vertical direction and in a front-rear direction.

The gripper 20 may operate to move up and down in a direction perpendicular to the negative electrode plate 30 and the positive electrode plate 40 by a servo motor (not shown), and may operate to move forward and backward in a direction of ends of the negative electrode plate 30 and the positive electrode plate 40 by the servo motor.

On the other hand, as shown in FIG. 12, the penetration hole 26 and the penetration groove 28 are formed in the gripper 20 so that the horizontal edge and the vertical edge of the negative electrode plate 30 and the horizontal edge and the vertical edge of the positive electrode plate 40 are exposed when the negative electrode plate 30 and the positive electrode plate 40 are fixed on the separator 12.

The rotation driver 8 may axially rotate the stack table 6 so that a surface of the stack table 6 faces the negative electrode plate photographing device 50 or the positive electrode plate and separator photographing device 60. The rotation driver 8 may include a drive motor operated by an electrical signal.

The negative electrode plate photographing device 50 may include the first camera 52 and the second camera 54 that are installed to face a coaxial direction with the negative electrode plate 30 and the separator 12 stacked on the stack table 6. The first camera 52 and the second camera 54 may photograph the horizontal edge and the vertical edge of the negative electrode plate 30.

The positive electrode plate and separator photographing device 60 may include the third camera 62 and the fourth camera 64 that are installed to face the coaxial direction with the positive electrode plate 40 and the separator 12 stacked on the stack table 6 at the side facing the first camera 52 and the second camera 54 with the stack table 6 interposed therebetween. After the stack table 6 is axially rotated toward the positive electrode plate and the separator photographing device 60, the third camera 62 and the fourth camera 64 may photograph the horizontal edge and the vertical edge of the positive electrode plate 40 and the horizontal edge of the separator 12.

The image processor may calculate the positions of the negative electrode plate 30, the positive electrode plate 40, and the separator 12 by synthesizing the first image and the second image obtained by the negative electrode plate photographing device 50 and the positive electrode plate and separator photographing device 60, and may determine the electrode alignment of the battery cell by calculating the gap between the negative electrode plate 30, the positive electrode plate 40, and the separator 12.

In addition, the image processor may perform the position correction when acquiring the first image and the second image based on the pre-registered master position photographed in the non-vibration state.

For these purposes, the image processor may be implemented as at least one processor operating by a predetermined program, and the predetermined program may be programmed to perform each step of the method for inspecting electrode alignment of the battery cell according to the embodiment of the present disclosure.

As described above, according to the present disclosure, it is possible to determine the alignment of the positive electrode plate and the negative electrode plate in real time by synthesizing the stacked image of the negative electrode plate and the separator and the stacked image of the positive electrode plate and the separator. Further, it is possible to prevent a folding defect in a region of the separator to improve manufacturing quality and reduce manufacturing cost.

Further, it is possible to inspect the electrode alignment after removing a noise in consideration of an interlocking state of equipment and vibration of the equipment to reduce a possibility of false-determination and improve inspection reliability.

Further, since it is possible to inspect the electrode alignment in real time, it is possible to reduce cost of sampling inspection disposal to increase production efficiency and strengthen product stability.

Further, since the same inspection method may be applied to various jelly roll manufacturing methods such as folding, stacking, and the like, applicability of the present disclosure is improved, and commonality thereof is enhanced.

While this present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the present disclosure.

DESCRIPTION OF SYMBOLS

| | |
|---|---|
| 6: stack table | 7: separator supply device |
| 8: rotation driver | 9: reference hole |
| 11: master position | 12: separator |
| 20: gripper | 22: first gripper |
| 24: second gripper | 26: penetration hole |
| 28: penetration groove | 30: negative electrode plate |
| 35, 37, 38, 39: intersection point | 40: positive electrode plate |
| 50: negative electrode plate photographing device | 52: first camera |
| 54: second camera | 60: positive electrode plate and separator photographing device |
| 62: third camera | 64: fourth camera |

What is claimed is:

1. A method for inspecting electrode alignment of a battery cell that inspects an alignment state of a jelly roll including a negative electrode plate, a positive electrode plate, and a separator of the battery cell, the method comprising:
supplying the separator onto a stack table and fixing opposite portions of the separator to the stack table using a first gripper and a second gripper;
rotating the stack table from a first orientation to a second orientation;
stacking the negative electrode plate on the separator;
releasing the first gripper and fixing the negative electrode plate on the separator by the first gripper;
obtaining, using a first imaging device, a first image by photographing the negative electrode plate stacked on the separator and by photographing a position of the negative electrode plate;
rotating the stack table from the second orientation to a third orientation different from the second orientation;
releasing the second gripper and supplying an additional separator onto the negative electrode plate;
stacking the positive electrode plate on the additional separator;
fixing the positive electrode plate on the additional separator by the second gripper;
obtaining, using a second imaging device, a second image by photographing the positive electrode plate stacked on the additional separator and by photographing a position of the positive electrode plate and a position of the additional separator;
aligning, by a processor, the first image and the second image on a predetermined virtual calculation screen to generate a synthesized image; and
measuring, by the processor, one or more gaps between the negative electrode plate, the positive electrode plate, and the separator based on the synthesized image.

2. The method of claim 1, wherein obtaining the first image comprises photographing the negative electrode plate using the first imaging device including a first camera and a second camera, and wherein the first camera and the second camera are arranged to capture images along a same viewing direction perpendicular to the negative electrode plate stacked on the separator.

3. The method of claim 2, wherein obtaining the second image comprises photographing the positive electrode plate using the second imaging device including a third camera and a fourth camera, and wherein the third camera and the fourth camera are arranged to capture images along a same viewing direction perpendicular to the positive electrode plate stacked on the separator, and disposed on a side of the stack table opposite to the first camera and the second camera, such that the stack table is interposed between (i) the first and second cameras and (ii) the third and fourth cameras.

4. The method of claim 3,
wherein photographing the position of the negative electrode plate comprises:
photographing, by the first camera and the second camera, a horizontal edge and a vertical edge of the negative electrode plate;
selecting two intersection points of the horizontal edge and the vertical edge of the negative electrode plate;
substituting the two intersection points on the predetermined virtual calculation screen;
substituting a pre-measured horizontal width of the negative electrode plate on the predetermined virtual calculation screen on which each of the two intersection points is substituted; and
calculating a vertical width of the negative electrode plate by connecting the two intersection points to each other.

5. The method of claim 3,
wherein photographing the position of the positive electrode plate and the position of the separator comprise:
photographing, by the third camera and the fourth camera, a horizontal edge and a vertical edge of the positive electrode plate and a horizontal edge of the separator;
selecting two intersection points of the horizontal edge and the vertical edge of the photographed positive electrode plate;
substituting the two intersection points on the predetermined virtual calculation screen;
substituting a pre-measured horizontal width of the positive electrode plate on the predetermined virtual calculation screen on which each of the two intersection points is substituted;

connecting the two intersection points to each other so that a vertical width of the positive electrode plate is calculated; and calculating a vertical width of the separator by substituting a vertical gap between the separator and the positive electrode plate on the predetermined virtual calculation screen.

6. The method of claim 1, wherein measuring the one or more gaps between the negative electrode plate, the positive electrode plate, and the separator comprises:

measuring a first gap in a vertical direction between the negative electrode plate and the separator, a second gap in the vertical direction between the positive electrode plate and the separator, a third gap in a horizontal direction between the negative electrode plate and the positive electrode plate, and a fourth gap in the vertical direction between the negative electrode plate and the positive electrode plate.

7. The method of claim 6, wherein the first gap is measured at two points, the second gap is measured at two points, the third gap is measured at four points, and the fourth gap is measured at four points.

8. The method of claim 1, further comprising: after obtaining the first image and the second image, correcting, by the processor, a position of the first image and a position of the second image based on a predetermined reference position.

9. The method of claim 8, wherein correcting the position of the first image and the position of the second image comprises;

determining, by the processor, a master position of a reference hole, the master position being obtained by capturing an image of the reference hole in a non-vibration state, the reference hole being formed in an outer area of the stack table outside a region where the negative electrode plate, the positive electrode plate, and the separator are stacked; and moving, by the processor, the position of the first image and the second image based on a difference between the master position and a position of the reference hole.

* * * * *